United States Patent Office 2,779,787
Patented Jan. 29, 1957

2,779,787
PREPARATION OF AROMATIC PHOSPHINOUS CHLORIDES

William A. Higgins, Cleveland Heights, George R. Norman, Cleveland, and Willis G. Craig, Willoughby, Ohio, assignors to The Lubrizol Corporation, Wickliffe, Ohio, a corporation of Ohio No Drawing. Application August 13, 1954,
Serial No. 449,796

10 Claims. (Cl. 260—543)

This invention relates to a novel method of synthesis of certain phosphorus-containing organic compounds, and in particular to such a method which involves the removal of chlorine from an organic compound.

It is a principal object of this invention to provide a process for the preparation of aromatic phosphinous chlorides. Another object is the provision of such a process which is both convenient and economical. Other objects of the invention will be apparent from the ensuing description thereof.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

It has been discovered that an aromatic phosphinous chloride can be prepared by the abstraction of chlorine from an aromatic phosphoranetrioic trichloride. This conversion is illustrated in the following equation:

$$Ar_2PCl_3 \rightarrow Ar_2PCl + 2Cl$$

The conversion is effected by heating the particular aromatic phosphoranetrioic trichloride, with or without a solvent, in the presence of an element selected from the class consisting of phosphorus, magnesium, potassium, carbon, and sodium. These elements serve to abstract chlorine from the aromatic phosphoranetrioic trichloride yielding in addition to the desired corresponding phosphinous chloride, phosphorus trichloride, sodium chloride, etc. It will be apparent to those skilled in the art that other elements such as zinc, tin, iron, arsenic, etc. may be used similarly in the process of this invention.

Broadly speaking, the process of this invention comprises heating a mixture of an aromatic phosphoranetrioic trichloride of the structure:

where Ar and Ar' are the same or different aromatic radicals each bound to phosphorus through a benzenoid carbon atom, and an element selected from the class consisting of phosphorus, magnesium, potassium, carbon, and sodium. The by-products; e. g., phosphorus trichloride, sodium chloride, etc. may be removed from the product with no difficulty. In those instances where phosphorus is used the by-product phosphorus trichloride is removed simply by distilling it from the product mixture. In the case of sodium chloride this by-product may be removed by filtering the product mixture. In some cases, particularly where the aromatic phosphinous chloride is intended to serve as an intermediate for organic synthetic work, it may not be necessary to remove these by-products. In other instances a particularly pure phosphinous chloride may be obtained by distilling the product at diminished pressure.

The temperature at which the process is generally conducted lies within the range of 100° C. to 225° C. Temperatures outside this range are permissible, but for optimum convenience it is preferred to operate within the above range. With regard to the relative amounts of reaction components, the stoichiometry of the reaction is indicated by the equations below:

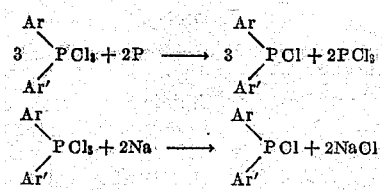

Generally it is preferred to use an amount of phosphorus or sodium (or such other element as the case may be) slightly in excess of that indicated by the stoichiometry of the above equations. This allows a more efficient utilization of the aromatic phosphoranetrioic trichloride which is inevitably the more expensive reaction component.

The use of a solvent is permissible and, in fact, for small-scale reactions, is advisable. Closer control of temperature is possible when a solvent is employed, and also losses of materials due to manipulative difficulties are reduced.

The identity of the aromatic radicals in aryl phosphoranetrioic trichlorides which may be used in the process described herein is established as those aromatic radicals which are nonfunctional. By the term nonfunctional it is meant to designate those radicals which neither take part directly in the reaction of the herein-described process nor do they have an active influence on the course of this reaction. Such nonfunctional aromatic radicals include single, multiple, and fused-ring aromatic radicals, especially those of the hydrocarbon type, which radicals may be unsubstituted or contain one or more substituent groups such as, e. g., alkyl, cycloalkyl, halogen, alkoxy, alkylmercapto, and the like. They may be illustrated by the following specific examples: phenyl, tolyl, xylyl, ethylphenyl, isopropylphenyl, tert-butylphenyl, tert-amylphenyl, octylphenyl, diisobutylphenyl, di-(tert-butyl) phenyl, di-(tert-amyl) phenyl, waxphenyl, kerylphenyl, xenyl naphthyl, α-methylnaphthyl, kerylnaphthyl, chlorophenyl, dichlorophenyl, trichlorophenyl, bromophenyl, chlorotolyl, anisyl, phenetyl, chloroanisyl, etc.

The aromatic phosphoranetrioic trichlorides are available as starting materials for this process from the chlorination either of the corresponding aromatic phosphinodithioic acids or the acid chlorides thereof. This chlorination reaction is the subject of copending application Serial No. 406,328, filed January 26, 1954.

The following specific examples are given to set forth in greater detail the actual practice of the invention. It is to be understood, however, that these are only illustrative and should not be construed as limiting the scope of the invention.

Example 1

A slurry of 500 grams (1.27 moles) of diphenyl phosphoranetrioic trichloride and 39.5 grams (1.27 moles) of red phosphorus in naphtha was slowly heated to 165° C., naphtha and phosphorus trichloride distilling from the mixture during this time. The residue was distilled to yield 247 grams of a fraction boiling at 110–140° C./0.3 mm. Analysis of this fraction established its identity as diphenyl phosphinous chloride:

Percent P _____ 13.7
Percent Cl _____ 16.0

Example 2

A naphtha slurry of diphenyl phosphoranetrioic trichloride prepared by the chlorination of 509 grams (2.0 moles) of diphenyl phosphinodithioic acid was treated with 63 grams (2.0 moles) of red phosphorus and the resulting mixture heated with stirring to 200° C. over a period of six hours. Stirring was continued for an additional hour at this temperature. The residue was filtered and the filtrate was distilled to yield 330 grams of a liquid fraction boiling at 103–106° C./0.2 mm. This fraction upon analysis was shown to be substantially pure diphenyl phosphinous chloride.

Example 3

A naphtha slurry of di(chlorophenyl) phosphoranetrioic trichloride prepared by the chlorination of the corresponding phosphino-dithioic acid was treated with 62.5 grams (2.0 moles) of phosphorus and this mixture then heated with stirring to 200° C. over a period of four hours. This temperature was maintained for an additional two hours with continued stirring. The residue was allowed to cool and then was filtered and the solid washed with naphtha. The filtrate and naphtha extract were combined and concentrated by evaporation over diminished pressure to yield 375 grams of material having the following analysis:

Percent P _____ 10.0
Percent Cl _____ 37.2
Percent S _____ 1.6

Fractional distillation of the above product yielded 281 grams of substantially pure di-(chlorophenyl) phosphinous chloride boiling at 147–150° C./0.2 mm. and having the following analysis:

Percent P _____ 10.3
Percent Cl _____ 36.5

Example 4

To a slurry of 337 grams (1.0 mole) of diphenyl phosphoranetrioic trichloride in 500 cc. of toluene at reflux temperature there was added portionwise with stirring 46 grams (2.0 moles) of sodium. When all the sodium had been added, the mixture was refluxed for an additional hour and then filtered and the filtrate concentrated by heating at 100° C./20 mm. The residue was distilled to yield 145 grams of a liquid boiling at 133–146° C./2.0 mm. This liquid is diphenyl phosphinous chloride as shown by the following analysis:

Percent P _____ 13.5
Percent Cl _____ 16.0

Example 5

A slurry of diphenyl phosphoranetrioic trichloride, prepared by the chlorination of 100 grams (0.4 mole) of diphenyl phosphinodithioic acid in 100 ml. of toluene, was treated with 10 grams (0.42 mole) of magnesium. The magnesium was added portionwise over a period of 1.5 hours at 100–110° C. and each addition caused foaming and evolution of hydrogen chloride. When all the magnesium had been added, the resultant mixture was stirred for an additional 1.5 hours at 110° C. A clear liquid was decanted from the cooled product. This liquid was concentrated by evaporation until there remained 25 grams of a brown, non-viscous liquid residue. This was distilled to yield 14 grams of a colorless liquid boiling at 86–94° C./0.1 mm. The following analyses indicated its identity as the desired diphenyl phosphinous chloride:

Percent phosphorus _____ 13.3
Percent chlorine _____ 17.8

Example 6

Diphenyl phosphoranetrioic trichloride was prepared by the chlorination of 50 grams (0.2 mole) of diphenyl phosphinodithioic acid. A slurry of this product in toluene was prepared, heated to 110° C., and then treated portionwise in an atmosphere of nitrogen with 15.6 grams (0.4 mole) of potassium. The potassium was added over a period of 8 hours and the mixture was heated at reflux temperature for an additional 1.5 hours. The cooled mixture was diluted with low-boiling petroleum ether and filtered. The filtrate was distilled to yield 17 grams of a colorless liquid boiling at 90–104° C./0.5 mm. This distillate showed the following analyses:

Percent phosphorus _____ 13.5
Percent chlorine _____ 16.5

Example 7

A benzene solution of 88 grams (0.4 mole) of diphenyl phosphinous chloride was treated with the theoretical amount of chlorine to produce the corresponding phosphoranetrioic trichloride. This product was treated with 2.4 grams (0.2 mole) of carbon and then freed of benzene by distillation. The residue was heated at 80–95° C. for 4 hours, whereupon the temperature was increased gradually through a 4-hour period to 210° C.; this latter temperature being maintained for an additional 2 hours. The resulting mixture was filtered. This filtrate was distilled, yielding 27 grams of a liquid fraction boiling at 89–115° C./0.1 mm. and having the following analyses:

Percent phosphorus _____ 13.5
Percent chlorine _____ 16.3

Other modes of applying the principle of the invention may be employed, change being made as regards the details described, provided the features stated in any of the following claims, or the equivalent of such, be employed.

We therefore particularly point out and distinctly claim as our invention:

1. The process of preparing aromatic phosphinous chlorides which comprises heating a mixture of an aromatic phosphoranetrioic trichloride having the structure

where Ar and Ar' are nonfunctional aromatic radicals each bound to the phosphorus atom through a benzenoid carbon atom, and an element selected from the class consisting of phosphorus, magnesium, potassium, carbon, and sodium.

2. The process of claim 1 characterized further in that Ar and Ar' are nonfunctional hydrocarbon aromatic radicals.

3. The process of claim 1 characterized further in that Ar and Ar' are nonfunctional halogen-substituted aromatic radicals.

4. The process of claim 1 characterized further in that Ar and Ar' are chloro-substituted aromatic radicals.

5. The process of claim 1 characterized further in that Ar and Ar' are phenyl radicals.

6. The process of preparing aromatic phosphinous chlorides which comprises heating at a temperature between 100° C. and 250° C. a mixture of an aromatic phosphoranetrioic trichloride having the structure

where Ar and Ar' are nonfunctional aromatic radicals each bound to the phosphorus atom through a benzenoid carbon atom, and an element selected from the class consisting of phosphorus, magnesium, potassium, carbon, and sodium.

7. The process of preparing aromatic phosphinous chlorides which comprises heating a mixture of elemental phosphorus and an aromatic phosphoranetrioic trichloride having the structure

where Ar and Ar' are nonfunctional aromatic radicals each bound to the phosphorus atom through a benzenoid carbon atom.

8. The process of claim 7 characterized further in that Ar and Ar' are nonfunctional aromatic hydrocarbon radicals.

9. The process of claim 7 characterized further in that Ar and Ar' are nonfunctional chloro-substituted aromatic radicals.

10. The process of claim 7 characterized further in that Ar and Ar' are phenyl radicals.

References Cited in the file of this patent

Kosolapoff Organo-phosphorus Compounds (Wiley & Son,, Inc.—1950) pgs. 19, 47 and 58.